United States Patent
Kohl et al.

(10) Patent No.: US 7,354,107 B2
(45) Date of Patent: Apr. 8, 2008

(54) VEHICLE SEAT WITH A DEFORMABLE S-SHAPED BACKREST

(75) Inventors: Josef Kohl, Hirschau (DE); Christian Erker, Usingen (DE)

(73) Assignee: Grammer AG, Amberg (DE)

( * ) Notice: Subject to any disclaimer, the term of this patent is extended or adjusted under 35 U.S.C. 154(b) by 64 days.

(21) Appl. No.: 11/279,226

(22) Filed: Apr. 10, 2006

(65) Prior Publication Data
US 2006/0250008 A1 Nov. 9, 2006

(30) Foreign Application Priority Data
Apr. 15, 2005 (DE) .................. 10 2005 017 634

(51) Int. Cl.
*A47C 7/14* (2006.01)
*A47C 7/46* (2006.01)

(52) U.S. Cl. ............... 297/284.4; 297/284.1; 297/284.9; 297/452.33; 297/452.34; 297/452.4

(58) Field of Classification Search ............ 297/284.1, 297/284.4, 284.9, 452.23, 452.33, 452.34, 297/452.4
See application file for complete search history.

(56) References Cited

U.S. PATENT DOCUMENTS 7,226,127 B1 * 6/2007 Yevko et al. ............ 297/284.1

2007/0080570 A1 * 4/2007 Kohl et al. .............. 297/284.4

FOREIGN PATENT DOCUMENTS

| DE | 2064419 | 7/1972 |
|---|---|---|
| DE | 19714576 A1 | 10/1998 |
| EP | 1352595 A2 | 10/2003 |

* cited by examiner

*Primary Examiner*—Rodney B. White
(74) *Attorney, Agent, or Firm*—Black Lowe & Graham PLLC

(57) ABSTRACT

A vehicle seat with a backrest and a seat part. The backrest includes a backrest frame and S-shaped rod elements arranged therebetween so as to form an S-shaped backrest having a shoulder region which can be deformed in the forward and backward direction and a lumbar spine region which can be deformed in the forward and backward direction. The rod elements, which extend in the longitudinal direction of the backrest, are pivotably mounted by their lower and upper ends on the backrest frame such that they can be pivoted about an imaginary axis which extends in the longitudinal direction of the backrest. The rod elements are mounted on the backrest frame such that they can be displaced in the longitudinal direction of the backrest.

9 Claims, 3 Drawing Sheets

VEHICLE SEAT WITH A DEFORMABLE S-SHAPED BACKREST

The invention relates to a vehicle seat with a backrest and a seat part, wherein the backrest comprises a backrest frame and S-shaped rod elements arranged therebetween so as to form an S-shaped backrest having a shoulder region which can be deformed in the forward and backward direction and a lumbar spine region which can be deformed in the forward and backward direction, wherein the rod elements, which extend in the longitudinal direction of the backrest, are pivotably mounted by their lower and upper ends on the backrest frame such that they can be pivoted about an imaginary axis which extends in the longitudinal direction of the backrest, according to the preamble of Claim 1.

Vehicle seats with deformable backrests are usually equipped with an adjustable lumbar support in the region of the lumbar spine of a person using the vehicle seat. Such lumbar supports can be adjusted both in the forward direction and in the backward direction so as, by means of a convex deformation of the backrest in the lumbar spine region, to provide more or less support for the person depending on whether said person has a more or less pronounced hollow in the small of his back, in order to increase the seating comfort.

The deformation of such lumbar spine supports is preset by the person, and remains as such until the person readjusts it for example by actuating a hand-wheel. This requires the use of at least one hand, which is often not available when the vehicle is being driven. Moreover, such vehicle seats have an S-shape which is adapted to the lumbar spine region and the shoulder region of the person using it, which is aimed at an average size of the person. Such an S-shaped backrest comprises the shoulder region, which is of concave design when seen in the direction of travel, and the lumbar spine region, which is of convex design, said regions being adapted to the shape of the spinal column of a human being of average size. This means that people who are smaller or larger than average experience a reduced seating comfort in such vehicle seats.

Seats are also known in which the S-shape of the backrest can be adjusted. This requires adaptation of the backrest inclination while retaining the person's field of vision.

This results in an undesirable change in the angle between the person's upper body and lower body.

EP 1 082 233 B1 discloses an elastic arch element for backrests, which acts as a lumbar support. The arch element consists of an essentially sheet-like arching element part and of at least one panel with two free resilient ends which is fixedly connected to said arching element part over a small surface area, wherein, when said element part is arched, the panel serves as a support with respect to a backrest pad arranged thereon. The arching part is actuated independently of the current position of a seat part of the vehicle seat, and requires the separate actuation of actuating elements provided for this purpose.

EP 0 957 716 B1 discloses a vehicle seat with a backrest and a seat part, in which a lumbar support mechanism is installed in the backrest region, said lumbar support mechanism being composed of a flexible support member which is secured at its upper and lower ends and can be drawn together such that an arch forms for example in the lumbar region. As a result, a lumbar support is obtained which can be adjusted in the forward direction so as, by means of a convex deformation of the backrest in the lumbar spine region, to provide more or less support for the person depending on whether said person has a more or less pronounced hollow in the small of his back, in order to increase the seating comfort.

Apart from the fact that they provide for deformation of the backrest only in the lumbar spine region, the known backrests described above are designed such that they undergo deformation in defined regions of the backrest, that is to say do not permit any adaptation of the backrest deformation to the size of the person using the vehicle seat, in particular the backrest thereof. This means that extremely large or extremely small people experience a reduced seating comfort.

Accordingly, the object of the present invention is to provide a vehicle seat with a seat part and an S-shaped backrest, which allows deformation of the backrest with increased seating comfort for people of different sizes.

This object is achieved according to the features of Claim 1.

One essential point of the invention lies in that, in a vehicle seat with a backrest and a seat part, in which the backrest comprises a backrest frame and S-shaped rod elements arranged therebetween so as to form an S-shaped backrest having a shoulder region which can be deformed in the forward and backward direction and a lumbar spine region which can be deformed in the forward and backward direction, the rod elements are mounted on the backrest frame such that they can be displaced in the longitudinal direction of the backrest. The rod elements, which extend in the longitudinal direction of the backrest, are pivotably mounted by their lower and upper ends on the backrest frame such that they can be pivoted about an imaginary axis which extends in the longitudinal direction of the backrest. In this way, the S-shaped rods can serve to make both the lumbar spine region and also the shoulder region more or less convex or concave, and additionally to displace these convex and concave regions of the backrest in terms of their height, so that even very small and very large people who are not of average size can arrange these convex and concave regions against the shoulder and lumbar spine regions of their back. This leads to increased seating comfort.

Moreover, the pivotable mounting of the S-shaped rod elements allows automatic deformation of the lumbar spine region and shoulder region in the forward direction without changing an existing inclined position of the backrest with respect to the seat part, in that the person, by exerting pressure using his shoulders, experiences for example a greater inward curvature of the shoulder region of the backrest and at the same time experiences an outward curvature, or a curvature directed towards the front in the direction of travel, of the lumbar spine region of the backrest. A movement or deformation of the S-shaped backrest in the opposite direction can be achieved by the person exerting pressure in the backward direction by means of his lumbar spine in the lumbar spine region of the backrest, as a result of which the lumbar spine region assumes a lesser forward curvature, while at the same time a lesser backward curvature is formed in the shoulder region of the backrest. In this way, a shift in the person's weight in the upper body region can result in a changed curvature of the backrest contour, which leads to a new supported curvature of the person's spinal column.

Since such a change in the backrest contour can be obtained in a simple manner by a shift in the person's weight in the upper body region or by the person exerting force with his back by changing the shape of his back, this can be carried out as often as necessary even while the vehicle is being driven, as a result of which damage to the intervertebral discs can be avoided on account of the frequent movement and muscles parts which are durably subjected to stress can be relieved. A massage effect may even be obtained as a result of the continuous changing of the curvature of the spinal column which is achieved as a result.

Preferably, the rod elements are formed as two parts such that in each case a first upper rod element part can be pivoted independently of a second lower rod element part. As a result, even better adaptation to the shape of the person's back is possible, particularly for small and very large people, since the separate rotation of the upper and lower rod element parts means that the convex and concave lumbar spine and shoulder regions can be moved towards one another and away from one another as seen in the longitudinal direction of the backrest.

The rod elements are preferably height-adjusted simultaneously. However, people often have a spinal column which is not completely straight on the left or right side, so that separate displacement or height adjustment of two S-shaped rod elements, at which a left side and a right side of the spinal column are arranged, in this case allows individual adaptation of the backrest to backs with a curved spinal column.

According to one preferred embodiment, each rod element is connected to the backrest frame at its lower and upper end by means of first and second connecting elements which are pivotably mounted on the backrest frame by means of pivot bearings. To this end, the lower and upper ends of each rod element may be fixed in an end region of the connecting element by means of connecting points.

The first pivot bearing of the first connecting element, which is assigned to the upper end of each rod element, comprises a first rod piece which is fixed to the backrest frame, which first rod piece can be displaced in its longitudinal direction relative to the backrest frame and runs through the first connecting element in a hole.

The second pivot bearing of the second connecting element, which is assigned to the lower end of each rod element, comprises a second rod piece which is fixed to the backrest frame, which second rod piece can be displaced in its longitudinal direction relative to the backrest frame and is connected at its end to the second connecting element. A pivot bearing of simple design is thus provided for the upper and lower ends of the rod elements, which not only allows rotation of the rod elements about the axis extending in the longitudinal direction of the backrest so as to form the more or less concave or convex lumbar spine and shoulder regions, but also allows a height displacement of these rods in a simple manner.

The second rod piece has at its lower end a stop element for limiting a sliding movement of the second rod piece.

An actuating element which is fitted on one or more of the rods serves for carrying out a sliding movement of at least one of the rod pieces, which means that a height adjustment of the S-shaped rods and thus adaptation to the various back lengths of the users is possible.

Further advantageous embodiments emerge from the dependent claims.

Advantages and expedient features can be found in the following description in conjunction with the drawing, in which.

Figure 1:
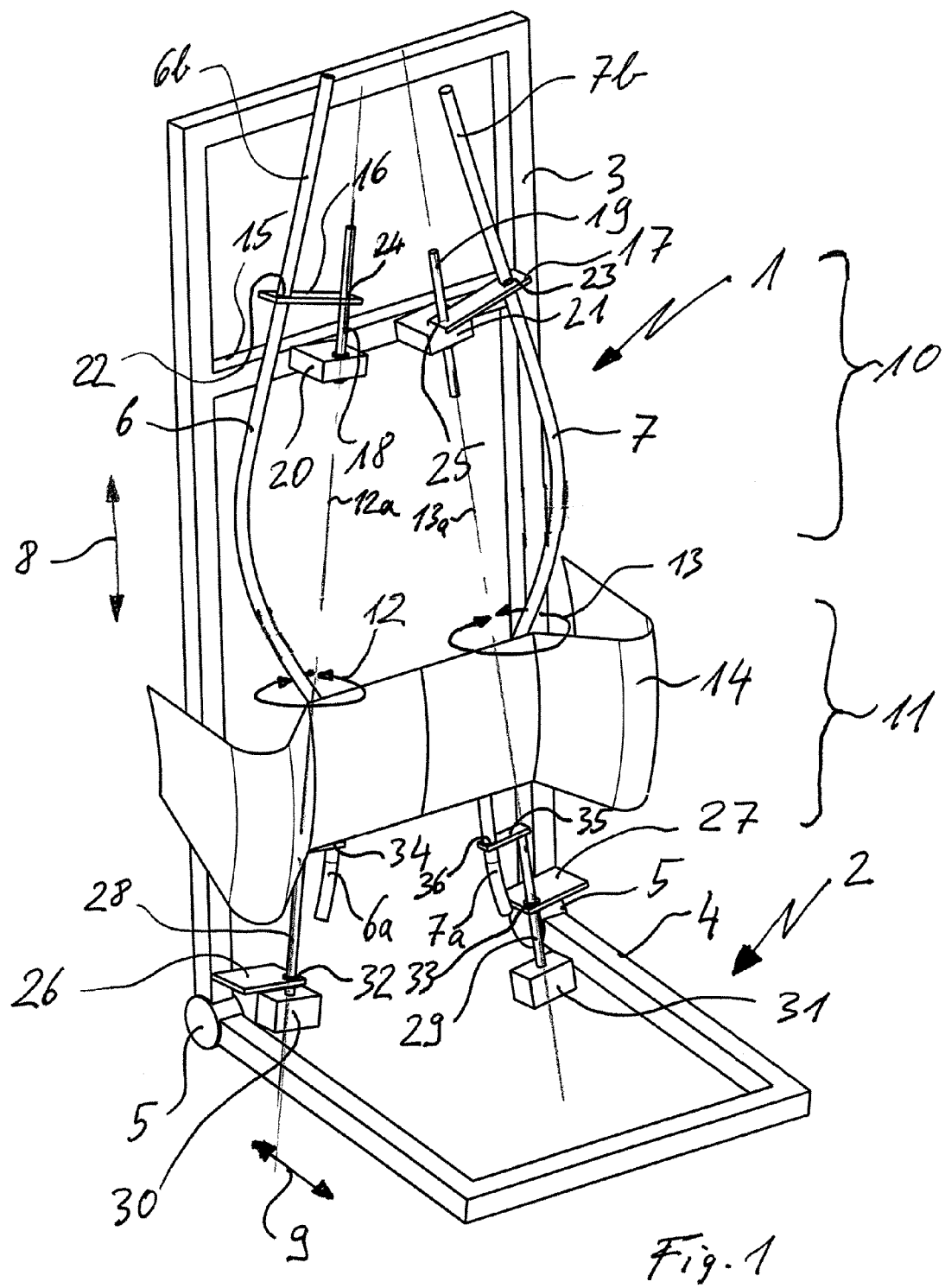
FIG. 1 shows a perspective, schematic view of the basic structure of a vehicle seat according to one embodiment of the invention, without a backrest pad and seat pad and with a backrest pad support in the lumbar region.

FIG. 1 shows a perspective, schematic view of the basic structure of a vehicle seat according to the invention. The vehicle seat comprises a backrest 1 and a seat part 2 with a backrest frame 3 and a seat part frame 4.

The backrest frame 3 can be pivoted, that is to say inclined, with respect to the seat part 4 by means of a pivot bearing 5.

Two S-shaped rods 6, 7 are connected to the backrest frame 3 at their lower ends 6a and 7a and at their upper ends 6b, 7b such that they can be rotated about an imaginary axis 12a, 13a extending in the longitudinal direction 8 of the backrest frame 3 and at the same time can be displaced in the longitudinal direction 8. The rotation is shown by references 12 and 13. This rotation can be locked in order to achieve a strong support for different back shapes. When the rod elements are unlocked, dynamic movement of the backrest is possible.

The S-shaped rods 6, 7 can be rotated to a greater or lesser extent in the forward and backward direction 9 by means of a rotational movement in a shoulder region 10 and a lumbar spine region 11, so that convex and concave shoulder and lumbar spine regions are produced.

Reference 14 denotes a part of a support which serves to transmit the sliding and rotational movement of the rods 6, 7 to a backrest pad (not shown here).

The backrest frame 3 has in its upper region a transverse strut 15 on which pivot bearings are arranged, said pivot bearings at the same time permitting displacement of the rod elements 6, 7 in the height direction. The rod elements 6, 7 are connected at their upper ends 6b, 7b by means of first plate-like connecting elements 16, 17 to first rod pieces 18, 19 which are in turn arranged on the transverse strut 15 via base parts 20, 21.

Figure 2:
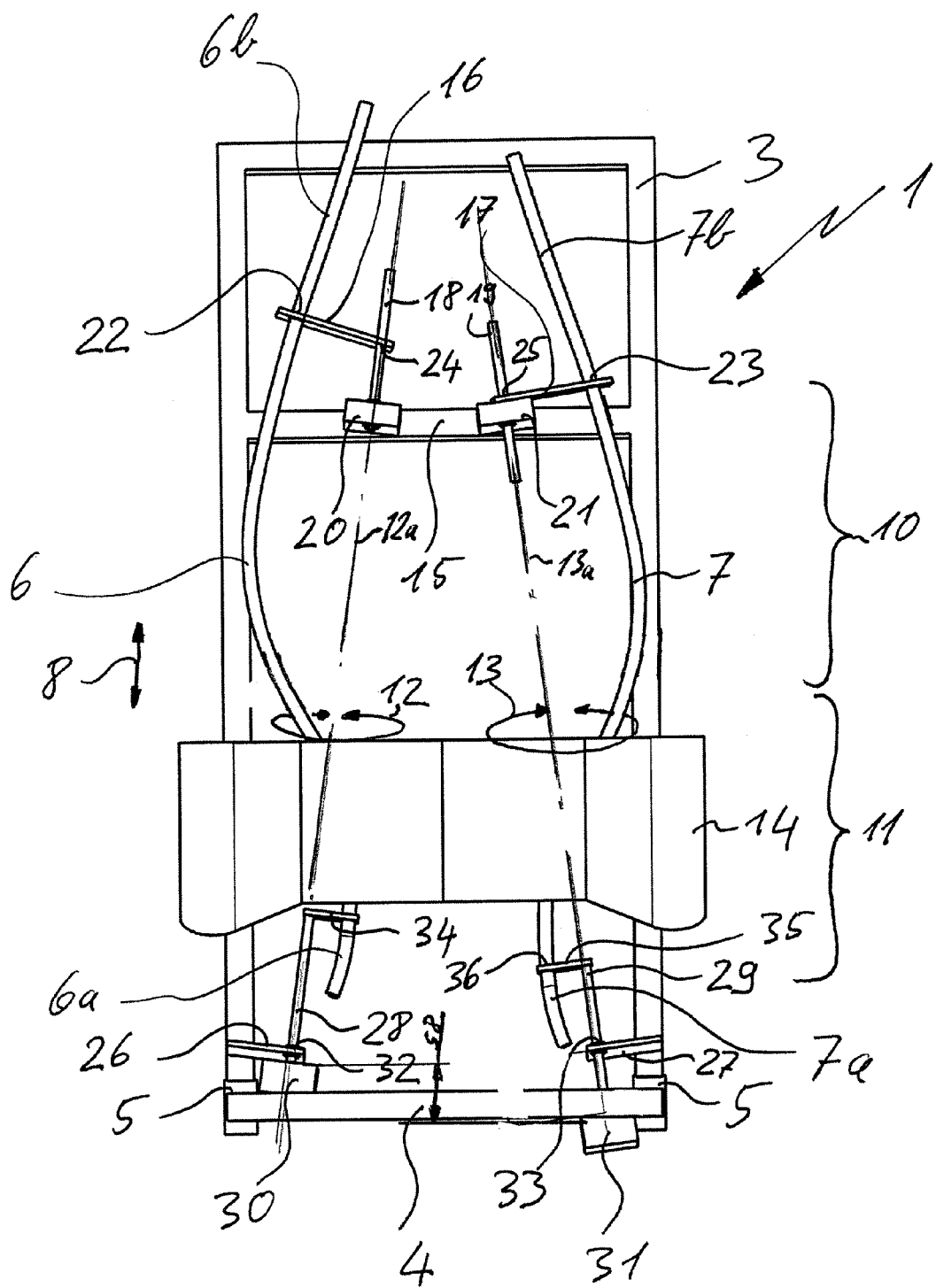
FIG. 2 shows a schematic front view of the vehicle seat shown in FIG. 1 according to the embodiment of the invention.
Figure 3:
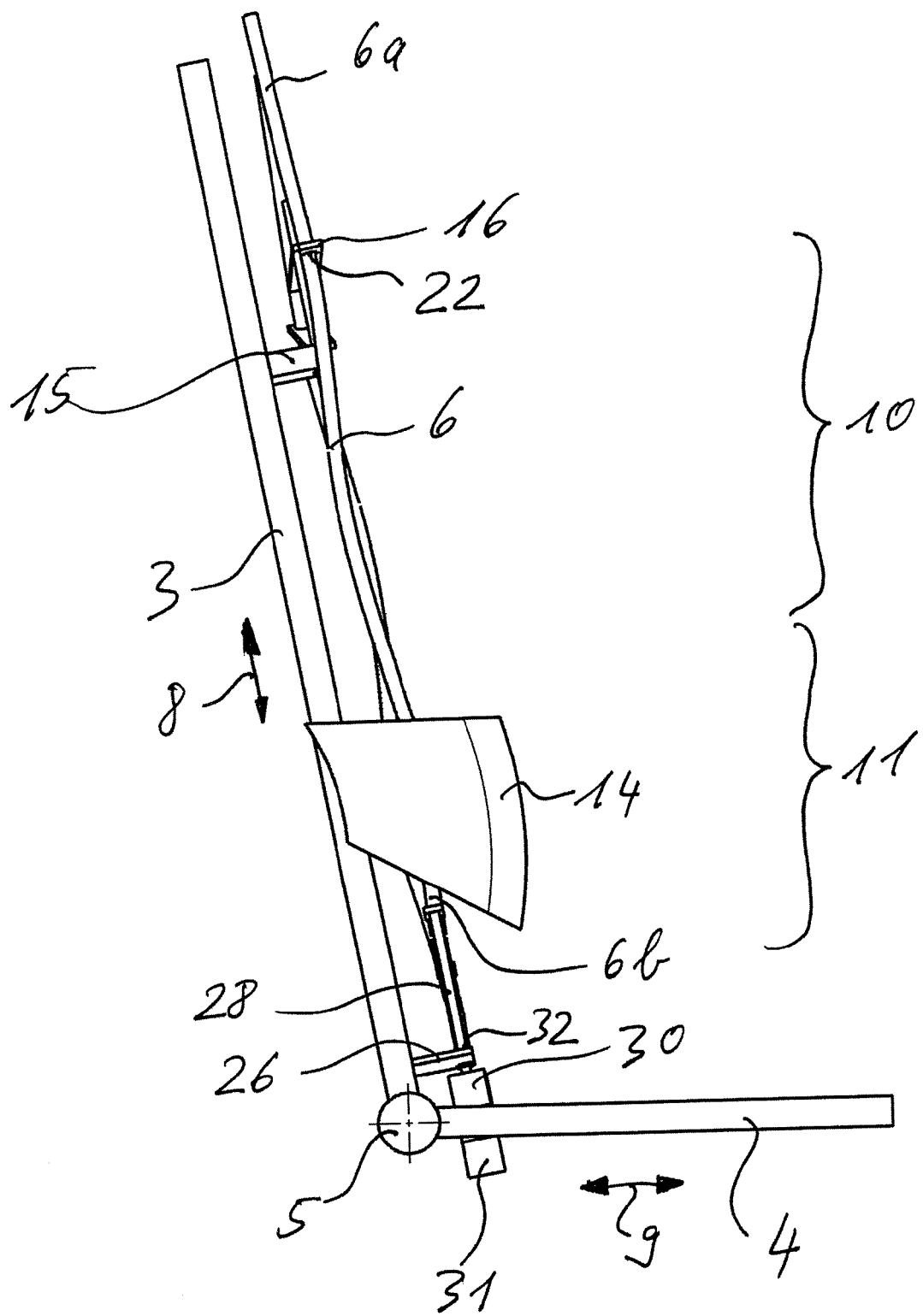
FIG. 3 shows a schematic side view of the vehicle seat shown in FIG. 1 and FIG. 2 according to the embodiment of the invention.

As can be seen from looking at FIG. 2 and FIG. 3 together, the rod elements 6, 7 run through the first connecting elements 16, 17 via a hole 22, 23 arranged therein, and can optionally be welded to the first connecting elements 16, 17 in this region. Alternatively, any type of connecting point can be used instead of the holes 22, 23 in the end region of the connecting elements.

Holes 24, 25 serve to connect the first connecting elements 16, 17 to the rod pieces 18, 19.

It can clearly be seen from FIGS. 1, 2 and 3 that the first rod pieces 18, 19, along with the second rod pieces 28, 29 at the lower ends 6a, 7a of the rods 6, 7, are displaceably mounted in the first base elements 20, 21 and second base elements 26, 27, respectively, in such a way that a sliding movement of the rod pieces 18, 19; 28, 29 gives rise to a simultaneous displacement of the rods 6, 7 in the longitudinal direction 8 of the backrest frame 3.

In order to limit such a sliding movement, which may be carried out for example over a distance of 58 mm or more, as can be seen from FIG. 2, the second rod pieces 28, 29 have stop elements 30, 31 at their lower ends, which stop elements make contact with the lower side of the second base elements 26, 27 at the point of maximum upward displacement of the rods 6, 7. The stop elements 30, 31 can at the same time serve as actuating elements (not shown here) for height adjustment of the rod elements 6, 7.

It can be seen from FIGS. 1, 2 and 3 that one of the rod elements is shown in the displaced state and the other rod element is shown in the non-displaced state. The rod elements are usually displaced together. However, separate displacement of the two rod elements 6, 7 is also possible, so that a more comfortable adaptation of the backrest to the respective back shape of the person using the vehicle seat is achieved.

The second rod pieces 28, 29 run through the second base elements 26, 27 so as to carry out the sliding movement in the holes 32, 33 in which a rotary bearing of known type may be arranged.

Second connecting elements 34, 35 are connected to the rod elements by means of connecting points, such as holes 36, in the region of which the connecting elements 34, 35 may be welded to the rod elements 6, 7. The second connecting elements 34, 35 are designed as levers and may have different lever lengths for adaptation to any lumbar sensitivity of the back.

All of the features disclosed in the application documents are claimed as essential to the invention in so far as they are novel individually or in combination with respect to the prior art.

LIST OF REFERENCES 1 backrest
2 seat part
3 backrest frame
4 seat part frame
5 pivot bearing
6, 7 S-shaped rod elements
6a, 7a lower ends of the rod-shaped rod elements
6b, 7b upper ends of the rod elements
8 longitudinal direction of the backrest
9 forward and backward direction
10 shoulder region
11 lumbar spine region
12, 13 rotational movement of the rod elements
12a, 13a axes
14 support element
15 transverse strut
16, 17 first connecting elements
18, 19 first rod pieces
20, 21 first base elements
22, 23 first connecting points of the first connecting elements
24, 25 holes of the first connecting elements
26, 27 second base elements
28, 29 second rod pieces
30, 31 stop elements
32, 33 holes of the second base elements
34, 35 second connecting elements
36 connecting points of the second connecting elements

What is claimed is:

1. A vehicle seat comprising:
    a seat part; and
    a backrest comprising:
        a backrest frame; and
        S-shaped rod elements arranged therebetween so as to form an S-shaped backrest having a shoulder region which is deformable in the forward and backward direction upon rotation of the rod elements and a lumbar spine region which is deformable in the forward and backward direction upon rotation of the rod elements, wherein the rod elements, which extend in the longitudinal direction of the backrest, are pivotably mounted by their lower and upper ends on the backrest frame such that the rod elements are pivotal about an imaginary axis which extends in the longitudinal direction of the backrest, the rod elements are mounted on the backrest frame such that the rod elements are displaceable in the longitudinal direction of the backrest.

2. The vehicle seat according to claim 1, wherein each rod element is connected to the backrest frame at its lower and upper end by means of first and second connecting elements which are pivotably mounted on the backrest frame by means of respective pivot bearings.

3. The vehicle seat according to claim 2, wherein the lower and upper ends of each rod element are arranged in an end region of the connecting element by means of connecting points.

4. The vehicle seat according to claim 2, wherein a first pivot bearing of the first connecting element, which is assigned to the upper end of each rod element, comprises a first rod piece which is fixed to the backrest frame, which first rod piece is displaceable in its longitudinal direction relative to the backrest frame and runs through the first connecting element in a hole.

5. The vehicle seat according to claim 2, wherein a second pivot bearing of the second connecting element, which is assigned to the lower end of each rod element, comprises a second rod piece, which is fixed to the backrest frame, the second rod piece is displaceable in its longitudinal direction relative to the backrest frame and is connected at an end to the second connecting element.

6. The vehicle seat according to claim 5, wherein the second rod piece has at its lower end a stop element for limiting a sliding movement of the second rod piece.

7. The vehicle seat according to claim 6, further comprising an actuating element which is fitted on one or more of the rod pieces for carrying out a sliding movement of at least one of the rod pieces.

8. The vehicle seat according to claim 1, wherein the rod elements are formed as two parts, wherein a first upper rod element part is pivotal independently of a second lower rod element part.

9. The vehicle seat according to claim 1, wherein the S-shaped rod elements are displaceable separately in the longitudinal direction of the backrest.

* * * * *